United States Patent
Mundheim

(10) Patent No.: US 11,247,920 B2
(45) Date of Patent: Feb. 15, 2022

(54) COMPOSITION AND METHOD FOR REMOVING IMPURITIES FROM A FLUID

(71) Applicant: M Vest Water AS, Bergen (NO)

(72) Inventor: Atle Mundheim, Omastrand (NO)

(73) Assignee: M Vest Water ASA, Bergen (NO)

( * ) Notice: Subject to any disclaimer, the term of this patent is extended or adjusted under 35 U.S.C. 154(b) by 0 days.

(21) Appl. No.: 16/636,915

(22) PCT Filed: Sep. 3, 2018

(86) PCT No.: PCT/IB2018/056707
§ 371 (c)(1),
(2) Date: Feb. 6, 2020

(87) PCT Pub. No.: WO2019/043654
PCT Pub. Date: Mar. 7, 2019

(65) Prior Publication Data
US 2020/0180983 A1 Jun. 11, 2020

(30) Foreign Application Priority Data
Sep. 4, 2017 (NO) .................................. 20171426

(51) Int. Cl.
| | | |
|---|---|---|
| *C02F 1/52* | (2006.01) | |
| *C02F 101/10* | (2006.01) | |
| *C02F 101/30* | (2006.01) | |
| *C02F 103/36* | (2006.01) | |

(52) U.S. Cl.
CPC ........ *C02F 1/5263* (2013.01); *C02F 2101/10* (2013.01); *C02F 2101/30* (2013.01); *C02F 2103/365* (2013.01)

(58) Field of Classification Search
CPC ... C02F 1/5245; C02F 1/5263; C02F 2101/30
See application file for complete search history.

(56) References Cited

U.S. PATENT DOCUMENTS

| | | |
|---|---|---|
| 4,317,735 A | 3/1982 | Crowe |
| 4,565,635 A | 1/1986 | Le Du et al. |
| 2007/0235391 A1 | 10/2007 | Ylikangas et al. |
| 2013/0256235 A1 | 10/2013 | Kneib et al. |

FOREIGN PATENT DOCUMENTS

| | | |
|---|---|---|
| GB | 2364047 | 1/2002 |
| JP | 2001219005 A | 8/2001 |
| WO | WO 2018/167598 | 9/2018 |

OTHER PUBLICATIONS

Kataoka, Katsuyuki et al.—JP 2001-29005 Machine Translation—2001 (Year: 2001).*
Avery M R et al.: "Use of Crosslinked Xanthan Gels in Actual Profile Modification Field", International Meeting on Petroleum Engineering, Mar. 17-20, Beijing, China, Society of Petroleum Engineers, No. SPE-14114, Mar. 17, 1986 (Mar. 17, 1986), pp. 559-568, XP009505881.
Francesco Gioia et al: "The containment of oil spills in porous media using xanthan/aluminum solutions, gelled by gaseous CO2 or by AlCl3 solutions", Journal of Hazardous Materials, vol. 138, No. 3, Dec. 1, 2006 (Dec. 1, 2006), pp. 500-506, XP055482325, Amsterdam, NL. ISSN: 0304-3894, DOI.
Nolte H et al: "Gelation of xanthan with trivalent metal ions", Carbohydrate Polymers, Applied Science Publishers, Ltd. Barking, GB, vol. 18, No. 4, Jan. 1, 1992 (Jan. 1, 1992), pp. 243-251, XP024147106, ISSN: 0144-8617, DOI: 10.1016/0144-8617(92)90089-9 [retrieved on.
Search Report dated May 4, 2021 in NO20171426.

\* cited by examiner

*Primary Examiner* — Bradley R Spies
(74) *Attorney, Agent, or Firm* — Christian D. Abel

(57) ABSTRACT

A product and method for removing contaminants from a stream of water in which the product according to the invention is mixed into a contaminated water stream and is reacting with contaminants into forming large easily separable anglomates. There are also disclosed uses of the method and the product for the separation of contamination from liquids.

12 Claims, No Drawings

COMPOSITION AND METHOD FOR REMOVING IMPURITIES FROM A FLUID

The present invention relates to a product, a process for the preparation of product compositions, and an application of the product for the removal of undesirable impurities from a liquid by mixing product as set forth in the preamble of the following claim 1.

The invention relates to a product of natural polysaccharide/hydrocolloid capable of crosslinking with multivalent cations when dissolved in a liquid in which product contains in solved form the multivalent cations sufficient for such crosslinking but in a form that causes the multivalent cations to become active first at dosage and mixing into contaminated liquid to be cleaned.

The invention relates to a liquid product of natural polysaccharide/hydrocolloid which is either dispersed unsolved, partially dissolved or dissolved in a liquid which also it is solved multivalent cations, preferably three-value cations of one or more of aluminum, iron and/or chromium, and optionally an acid for pH regulation if necessary, either present or mixed in. The product may also include prepolymerized aluminum (PAX/PAC) or another coagulant.

More specifically, the invention relates to a composition of a product for the removal of unwanted contaminants in process liquids where the product composition consists of a base fluid, such as, but not limited to, an alcohol or a mixed alcohol/water or a pure water-based alcohol-free base fluid in which it is interfered a powdered polysaccharide/hydrocolloid or a mixture of polysaccharides/hydrocolloids where this powder swells and remains completely or partially dissolved or completely or partially dissolved in the mixture or completely dissolved in pure water to form a viscous liquid/gel in which the pH adjust to less than 4 if trivalent aluminum is to be used for crosslinking to below 5 if trivalent chromium is to be used for crosslinking and to pH below 1.5 if trivalent iron is used for crosslinking, after which liquid with loose crosslinking cation is mixed, preferably of trivalent aluminum, iron or chromium or a mixture of these that have solution of cations respectively, pH below 4, or 1.5 or 5 for aluminum, iron or chromium (hereinafter referred to as threshold values).

The invention also relates to a combination in which an acidic coagulant may be included in the product such as prepolymerized aluminum (PAX/PAC), trivalent iron and/or trivalent aluminum, or trivalent chromium under pH conditions as described above, after which base liquid with polysaccharide, homogeneously mixed with polymerized aluminum (PAX/PAC) with solved trivalent cation on ionic form. Coagulant and base fluid must have a pH below specified threshold values for respective trivalent cations to be mixed in.

Thus, the invention relates to a product which is either partially or partially dissolved, partly dissolved or dissolved polysaccharide/hydrocolloid and completely solved crosslinking cation, in a liquid where crosslinking does not occur in the product even if one or more crosslinking cations and polysaccharides are dissolved in the same liquid.

The invention also relates to a product in which solved cross-linking cations and unsolved, fully or partially dissolved polysaccharide/hydrocoloid are present in the same fluid, in which also a coagulant is present, wherein none of these subcomponents is reacting with each other at a pH below the given threshold value.

The invention relates to an admixture of the product in a contaminated liquid where the pH exceeds the threshold value for the product's component components to react with each other so that polysaccharide/hydrocolloid chains bind to contamination which, if the coagulant is included, will flocculate particles of coagulated contamination with attached polysaccharide chains by crosslinking between trivalent cations and polysaccharide chains.

The invention also relates to applications of the product and the method for the specified processes.

The invention is related to the technology which is based on the manufacture of a product that will remove contaminants in a process water stream, by that the product contains one or more natural polysaccharides encapsulating contaminants in water, whereby the product preferably but not conditional to, simultaneously contain a coagulant (of preferred polyaluminum chloride) which coagulates impurities, as well as the product contains multivalent cations that crosslink the polysaccharide chains so that they take a gel form and accumulate coagulated organic and inorganic impurities in the water into large easily separable conglomerates. In accordance with the present invention, this is achieved by simultaneous injection of a product consisting of undissolved partially dissolved or solved polysaccharides, which may also contain a coagulant (prepolymerized aluminum chloride (PAX/PAC) and dissolved trivalent cations mixed together in a base fluid, with or without water or in water alone.

The invention also relates to being able to mix solved/dissolved/partially dissolved polysaccharide and solved crosslinked trivalent cation without crosslinking occurring by lowering the pH to under activation pH for crosslinking between trivalent cation and polysaccharide (threshold value).

The invention is also related to injecting polysaccharide dispersed in a undissolved form, partially dissolved or in solved form simultaneously with coagulating prepolymerized aluminum (PAX/PAC) and crosslinked dissolved cations in a single dose and in one and the same product according to the present invention, without that crosslinking occur before polysaccharide is dissolved in the process water stream and encapsulate contamination and coagulates in the process water stream, by that such hydration in water, encapsulation and coagulation of contaminants in the process water stream caused by the polysaccharides and PAX/PAC takes place before crosslinking cations, which are simultaneous in dosed, crosslinks coagulated polysaccharide attached to contamination.

The invention is also contemplated by using the product and the process of the invention for improved separation of undesired contamination in a process water stream.

Known Products and Methods Currently in Use

It is known that there are a variety of polysaccharides/hydrocolloids that crosslink with multivalent cations. Including products from the groups; marine plants, terrestrial plants, microbial polysaccharides and polysaccharide derivatives such as Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene Glycol Alginate, Pectin, Curdlan, Hydroxypropyl Guar, Tamarind seed gum and Pullulan.

It is known a number of these products are used to form viscosity and emulsion stability in various products in the food industry, cosmetics industry, oil industry as well as in a variety of general industrial applications.

It is also well-known that a method of avoiding clumping by dissolving polysaccharides in water is to disperse them in an oil or in an alcohol or glycerol.

Further, it is known that said polysaccharides can be crosslinked to gel using gelling agents, including multivalent cations.

From the oil industry it is known that polysaccharides can be used as viscosity promotional additives in fracturing fluids, drilling fluids and supplemental fluids. In drilling fluids they also function as emulsion stabilizers in oil-based drilling mud and, due to their tixotropic properties, have the ability to hold solids in suspension upon standing.

The applications in the oil industry mean that the polysaccharides are previously dissolved and stabilized by crosslinking in the drilling, completion and fracturing fluids.

It is also known that anionic polysaccharides/hydrocolloids can be used in process water treatment to improve separation of contaminants by adding them water hydrated in a dilute solution into a process water stream, after which they are reacted with multivalent cations for crosslinking, whereby flocculation into large easily separable conglomerates of contamination and polysaccharide takes place.

It is known that by strong water dilution and instantaneous mixing can avoid premature gelling, that is, crosslinking takes place before polysaccharide chains contact contaminants in the process water, in water where active multivalent cations are present. In particular, this is known from the use of alginates, carrageenan and pectin, which crosslink with divalent cations. It is also known that such divalent cations are present in most produced water compositions that relate to oil reservoir production of oil/gas/water mixtures.

It is also known that such premature gelling can be avoided by using retardant chemicals combined with injection, and that activating chemicals may be used in which inactivated multivalent cations are present in a contaminated production water stream.

It is also known that in water with a high content of cations and salts, high water dilution and pre-highly water-free polysaccharide are used by injection.

It is known that one can cause the various polysaccharides to be water-insulated to enclose contamination, then flocculate contamination by crosslinking by new injection and mixing of dissolved or insoluble water-soluble multivalent cation.

It is also known that many present components in produced water from an oil reservoir contain natural or added substances that inhibit crosslinking of water-solved polysaccharide by divalent cations. Typical natural inhibitors are hydrogen carbonate and typically added inhibitors are scale inhibitors. Both of these bind up one or more of the free valences of the cations. For linking to a polysaccharide it is sufficient for 1 free valence in the cation, such as for example in Ca2+, but to crosslink two polysaccharides, at least two valences must be free for crosslinking.

Polyaluminium chloride is one of the most commonly used coagulants in water purification. It is used in different concentrations in both solid and liquid form. Prepolymerized aluminum does not cross-link polysaccharides. It is nevertheless known that polysaccharides are used as an assistant coagulant together with polyaluminum chloride. The polysaccharide chains adhere to particles and help coagulants to get something to bond to.

It is not known to mix loose, partially dissolved or loose natural polysaccharide in a liquid together with PAX/PAC and crosslinking liquid-soluble trivalent cations without crosslinking with polysaccharide prior to mixing into a contaminated process water stream.

Nor is it known that by lowering the pH in a solution of 4 for trivalent aluminum, and below 1.5 for trivalent iron and below 5 for trivalent chromium, up to saturated solution, mix this with high concentrated solved/partially dissolved or undissolved polysaccharide in a base fluid where the pH during mixing does not exceed these values. It was surprisingly found that at low pH, said trivalent dissolved crosslinking cations may be blended with polysaccharide without such crosslinking to occur, a crosslinking that normally take place at higher pH. It is not known that one can make such a mixture at low pH and dose and mix small amounts into a contaminated liquid where polysaccharide will bond to contaminants and trivalent cations then crosslink it all to large flocks and conglomerates as the pH of contaminated liquid is over threshold for inactivation of crosslinking. The threshold value is defined to pH 4 for trivalent aluminum solutions, and to pH 1.5 for trivalent iron solutions and pH 5 for trivalent chromium solutions.

DETAILED DESCRIPTION OF THE INVENTION

It is an objective of the invention to provide a product for injection into a contaminated water stream for the removal of solved and/or unsolved organic and/or inorganic contaminants from a liquid, where the product consists of a base fluid of an alcohol or an alcohol/water mixture, or water in which it is dispersed, partially solved or solved one or more powdered natural polysaccharide which has the property of crosslinking with trivalent cations and wherein the pH is lowered to less than 4 before the addition of trivalent aluminum, or lowered to less than 1.5 before addition of trivalent iron, or to less than 5 before addition of trivalent chromium dissolved in water or by that polyaluminum chloride (PAX/PAC) is added. Such pH reduction may be carried out by that a base fluid with dispersed may be carried out by adding to solid liquid with dispersed/fully/partially dissolved polysaccharide is added sufficient amounts of polyaluminum chloride which is highly acidic. In this way, the product is a coagulant assistant in the polysaccharide which coagulates with PAX/PAC and polysaccharide crosslinks to strong conglomerate.

It is an objective of the invention to provide a product for injection into a contaminated water stream for the removal of dissolved and/or insoluble organic and/or inorganic impurities from a liquid stream in that the pulverized polysaccharide consists of one or more of Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene Glycol Alginate, Pectin, Curdlan, Hydroxypropyl Guar, Tamarind seed gum and/or Pullulan, of which preferred polysaccharide is Xanthan.

It is an objective of the invention to provide a product for injection into a contaminated water stream for the removal of dissolved and/or insoluble organic and/or inorganic contaminants from a liquid stream where the product is comprising a trivalent cation in a liquid with a pH below the crosslinking threshold with polysaccharide where the product is consisting of one or more liquid-soluble trivalent cations which mixed into contaminated water with a pH above threshold for crosslinking, crosslinks solved polysaccharide, where preferred cation is, but not limited to, a trivalent cation composition of aluminum, iron or chromium.

It is an objective of the invention to provide a product for the removal of dissolved and/or undissolved organic and/or inorganic contaminants from a liquid stream in which the product according to the invention is injected and mixed into a contaminated aqueous liquid stream whereby in the first time interval the required proportion water-solved polysaccharide bonds to contamination in water, where after in a second time interval a coagulation with PAX/PAC takes place, where after the cross-linking cations of the product crosslink followed by subsequent agglomeration of contamination and crosslinked polysaccharide.

It is an object of the invention to provide a product for the removal of dissolved and/or insoluble organic and/or inorganic impurities from a liquid stream, which product is injected and mixed at 1-1000 ppm of the product in the contaminated liquid stream, where a preferred injection rate is 1-50 ppm, and yet another more preferred injection rate is 1-20 ppm.

It is also an objective to provide an application of the product and method according to the invention as a oil/water/particle separation promoting agent for a contaminated water stream where water comes from the oil production reservoir and is to be purified for discharge to the sea or purified for re-injection into the reservoir.

It is also an objective to provide an application of the product and method according to the invention to oil/water/particle separation promoting agent for a contaminated water stream where water comes from well operations in connection with oil and gas production or drilling for oil or gas It is also an objective to provide an application of the product and method of the invention as a emulsionbreaker in connection with oil and gas production to remove water in the oil phase.

It is also an objective to provide an application of the product and process according to the invention to oil/water/particle separation promoting agent from a contaminated water stream where water is waste water from drilling and/or production ships, floating or fixed platforms, or from oil-related land-based operations.

It is also an objective to provide an application of the product and method of the invention to oil/water/particle separation promoting agent in a contaminated water stream where water is waste water or process water in/from refineries or petrochemical industry.

It is also an objective to provide an application of the product and method of the invention to a separating agent for the separation of organic and inorganic contamination in a contaminated water stream from industrial or municipal wastewater and in drinking water purification.

It is also an objective to provide an application of the product and method of the invention to a separating agent for improved separation of organic and inorganic contamination in a water stream where the product is used prior to separation into one or more of hydro cyclones, flotation devices/processes, sedimentation devices/processes, mechanical filter devices/processes, media filter devices/processes, membrane filters/processes, reverse osmosis devices/processes, centrifuge devices/processes and/or decanter devices/processes, UV treatment devices/processes, evaporation devices/processes, electrolysis devices/processes.

The product, methods and applications of the invention are characterized by the features evident in the following dependent claims.

Further features of the invention are set forth in the independent claims. Accordingly, according to the present invention it is provided a product for injecting into a contaminated water stream for the removal of dissolved and/or insoluble organic and/or inorganic impurities from a liquid, a product consisting of a base liquid in which it is dispersed, partially solved or solved or more powdered natural polysaccharide which has the property of crosslinking with trivalent cations and wherein the pH is lowered to less than 4 before the addition of trivalent aluminum or to less than 1.5 before the addition of trivalent iron or to less than 5 before the addition of trivalent chromium dissolved in water, or where polyaluminum chloride (PAX/PAC) is added. Such pH reduction may be carried out by adding to a base fluid containing dispersed/fully/partially solved polysaccharide a sufficient amount polyaluminum chloride which is highly acidic. In this way, the product gets a help coagulant in the polysaccharide that coagulates with PAX/PAC, and the polysaccharide crosslinks to strong conglomerates.

According to the present invention there is thus provided a new and improved product for injecting into a contaminated water stream for the removal of dissolved and/or insoluble organic and/or inorganic impurities from a liquid stream in that the pulverized polysaccharide consists of one or more of Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene glycol Alginate, Pectin, Curdlan, Hydroxypropyl Guar, Tamarind Seed gum and/or Pullulan, which is polysaccharide, is Xanthan.

According to the present invention, there is thus obtained a product for dosing into a contaminated water stream for the removal of dissolved and/or insoluble organic and/or inorganic impurities from a liquid stream a trivalent cation in a liquid with a pH below the threshold for crosslinking with polysaccharide, consisting of one or more liquid-soluble trivalent cations when mixed into the contaminated water with a pH above threshold for crosslinking will crosslink solved polysaccharide, where preferred cation is, but not is limited to, a trivalent cation composition of aluminum, iron or chromium.

According to the present invention there is thus provided a product for the removal of dissolved and/or undissolved organic and/or inorganic contaminants from a liquid stream in which the product of the invention is injected and admixed into a contaminated aqueous liquid stream whereby in the first time interval the required proportion of water solved polysaccharide bonds to contamination in water, and in a second time interval there is a coagulation with PAX/PAC where upon the cross-linking cations of the product crosslink with subsequent agglomeration of contamination and cross-linked to polysaccharide.

According to the present invention, it is a product for the removal of dissolved and/or insoluble organic and/or inorganic contaminants from a liquid stream, which is injected and mixed with 1-1000 ppm of the product in the contaminated liquid stream, with a preferred injection being 1-50 ppm, and an even more preferred inhalation is 1-20 ppm.

Accordingly, according to the present invention there is provided an application of the product and method of the invention to oil/water/particle separation promoting agent from a contaminated water stream where water comes from an oil production reservoir and is to be purified for discharge to the sea or purified for re-injection in the reservoir.

According to the present invention, there is thus obtained an application of the product and method of the invention for oil/water/particle separation promoting agent for a contaminated water stream where water comes from well operations in connection with oil and gas production or drilling for oil or gas.

According to the present invention, there is thus provided an application of the product and method of the invention for emulsion breaking in connection with oil and gas production to remove water in the oil phase.

According to the present invention, there is thus provided an application of the product and method according to the invention for oil/water/particle separation promoting agent from a contaminated water stream where water is waste water from drilling and/or production ships, floating or fixed platforms, or from oil-related land-based operations.

According to the present invention, there is thus obtained an application of the product and method of the invention for oil/water/particle separation promoting agent from a contaminated water stream where water is waste water or process water in/from refinery or petrochemical industry.

According to the present invention there is thus provided an application of the product and method of the invention as a separating agent for the separation of organic and inorganic contamination from a contaminated water stream from industrial or municipal wastewater and for the purification of drinking water.

According to the present invention there is thus provided an application of the product and method of the invention as a separating agent for improved separation of organic and inorganic contamination in a water stream where the product is used prior to separation into one or more cyclones, flotation device/process, sedimentation device/process, mechanical filter device/process, media filter device/process, membrane filter/process, reverse osmosis device/process, centrifuge device/process and/or decanter device/process, UV treatment device/process, evaporation device/process, electrolysis device/process The product according to the invention is characterized in that the product consists of a base fluid in which it is dispersed, partially solved or solved one or more powdered natural polysaccharide/hydrocolloid which is capable of crosslinking with multivalent cations and wherein it is mixed in solved multivalent cations sufficient to crosslink all polysaccharide/hydrocolloid chains, wherein both base fluid and dissolved cation fluid are pH adjusted with an acid below the threshold where crosslinking may occur.

Further, the product is characterized in that powdered polysaccharide/hydrocolloid consists of one or more of Agar, Guar gum, Dextran, Carboxy Methyl cellulose, Alginates, Gum Arabic, Gellan gum, Methyl Hydroxypropyl cellulose, Carrageenan Gum Tragacanth, Rhamsan gum, Hydroxypropyl cellulose, Furcellaran, Karaya gum, Welan gum, Hydroxyethyl cellulose, Locust bean gum, Xanthan gum, Propylene Glycol Alginate, Pectin, Curdlan, Hydroxypropyl Guar, Tamarind seed gum and/or Pullulan, which is polysaccharide, is Xanthan.

The product according to the invention is also characterized in that crosslinking cation consists of at least one of liquid-solved trivalent aluminum and/or to trivalent iron and/or trivalent chromium and wherein the pH in solution is lowered to less than 4 before/by the addition of solved trivalent aluminum to under 1.5 before/by the addition of solved trivalent iron and to less than 5 before/by the addition of solved trivalent chromium.

Furthermore, the product according to the invention is characterized in that alternatively a coagulant with at least equally low pH is also added or used for dissolving multivalent cation prior to addition.

Finally, the product according to the invention is characterized in that the coagulant may be prepolymerized aluminum.

A process for preparing the product according to the invention is characterized in that polysaccharide/hydrocolloid is mixed with a liquid or mixture of liquids in which polysaccharide/hydrocolloid remains unresolved, partially solved or solved, after which the pH of the mixture is adjusted to upper threshold or lower where intended multivalent crosslinking cations are inactivated for crosslinking, after which crosslinking cations are solved in liquid with pH below upper threshold where cations can cross bind polysaccharide/hydrocolloid, after which pH adjusted liquid with polysaccharide/hydrocolloid and pH-adjusted liquid with crosslinking solved cation are homogeneously mixed.

Further, a process for the preparation of the product according to the invention is characterized in that coagulant having a pH equal to or lower than the threshold for crosslinking activation of multivalent cation is added to the product as an addition or that coagulant is used as a solvent for solving multivalent cations.

Method of use of the product according to the invention is characterized in that the product of the invention is dosed and admixed in a contaminated aqueous liquid having a pH above the inactivation pH for crosslinking between polysaccharide/hydrocolloid and multivalent cations whereby during the first time interval the required proportion of water solved polysaccharide bonds to contaminate in the liquid, or dissolve and bind to contamination in the liquid, and whereafter it in the first and second time interval takes place a coagulation hence coagulant if applied by means of charge neutralization bonds to particles with polysaccharide chains attached, whereafter the products crosslinking cations crosslink, followed by agglomeration and flockulation and separation of contamination.

A method of using a product according to the invention is further characterized in that it is dosed and mixed 1-1000 ppm of the product in the contaminated liquid, with a preferred in dosage being 1-50 ppm, and an even more preferred in dosage is 1-20 ppm.

Use of the product and process according to the invention is characterized as a separating agent for oil/water I/particle separation from a contaminated water stream where water comes from the oil production reservoir and is to be purified for discharge to the sea or purified for re-injection into the reservoir.

Use of the product and process according to the invention is characterized as oil/water/particle separation promoting agent from a contaminated water stream where water comes from well operations in connection with oil and gas production or drilling for oil or gas.

Use of the product and process according to the invention is characterized as oil/water/particle separation promoting separation from a contaminated water stream where water is waste water from drilling and/or production ships, floating or fixed platforms, or from oil-related land-based operations.

Use of the product and process according to the invention is characterized as oil/water/particle separation promoting agent from a contaminated liquid where liquid is waste liquid or process fluid in/from oil and gas production from reservoirs, refineries or petrochemicals.

Use of a product and process according to the invention characterized as a separating agent for the separation of organic and inorganic contamination from a contaminated water stream from industrial or municipal wastewater or for the purification of drinking water.

Use of product and method according to the invention characterized as separation enhancing substance for improved separation of organic and inorganic contamination in a waterflow.

Advantages of the Present New Method

The present product has the advantage that it can be dosed highly concentrated into a large produced water stream or process water flow dispersed. A slurry of dispersed polysaccharide, PAX/PAC and trivalent cations in solved form in addition to dispersion fluid, could contain, for example, 25% by weight of dry matter in alcohol dispersion. In this, a concentrated saturated mixture of trivalent cations can be shearmixed in water with a pH below the threshold value. Similarly, concentrated coagulant can be mixed in.

One will see one single slurry dosing point onboard a platform for the purification of oily produced water and 2 m3 product will treat 100,000 m3 of water.

Similarly, using water-soluble polysaccharide, such as Alginate, would involve large quantities of fresh water, as this should typically be diluted to a 0.05% freshwater solution according to known technology. In the such case then 1000 m3 of fresh water would be consumed for dilution daily. This is for an oil platform very extensive water consumption, and in many countries unimaginable consumption of fresh water. The present invention does not use freshwater.

Further, by known technology, two dosing systems and dosage points and two mixing devices are required. In the oil industry, this is very extensive n modifications, and logistically, it is very little desirable with 2 chemicals if possible. 1. The present invention reduces the need for 1 dosage and infusion system and significantly simplifies logistics in that both reactant and polysaccharide are present in one and the same dispersion fluid. In the present product composition, polysaccharides can be dissolved concentrated and multivalent cation content may be highly concentrated in the same mixture. For example, Xanthan may be used as Xanthan does not react with divalent cations in the produced water and it can be dissolved in high saline water. Up to 8-10% solution can be dissolved in water or a mixture of water and alcohol or oil. By adding trivalent cations of aluminum, iron or chromium according to the invention in the same mixture, Xanthan and cations will not react reactively before this mixture is dosed into water of higher pH and it will react with the bonding of particles and oil drops with subsequent crosslinking. The It is not known that Xanthan has been used for the purification of water in the oil industry. This except for the inventor's own unpublished patent applications.

Of all natural polysaccharides, Xanthan is the most widely used in the oil industry, but exclusively used for other purposes a water purification. However, it is 10 times less expensive than the known polysaccharides used for water purification, and the present invention thus also represents major economic savings for the industry.

It is known that natural polysaccharides have a short life span due to biological activity when dissolving in water. A maximum of 2-3 weeks of shelf life for flocculating natural polysaccharide is common. In the present invention, polysaccharides are not hydrated and durability is as in dry state or better. That is, more than a 2 year shelf life. In acid solution, durability is the same.

By the present invention there is produced a product and method which has great economic, practical, logistic, and environmental advantages over prior art.

The present invention has the advantage that the products are without adverse effect on the marine environment.

Furthermore, the present invention has the advantage that all injected products are reacted and separated by proper stoichiometric formulation of polysaccharide and crosslinking cationic reactant. That is, no emissions to the marine environment or no supply of surplus flocculant in the reservoir if water is reinjected under/in the oil reservoir. Conventional flocculants yield surpluses that follow the water phase at sea or to reservoir with potentially large adverse effects.

The preferred Xanthan and crosslinking with trivalent cations are advantageously to prior art technology in that it in the unsolved dispersed form can be solved directly in produced water from oil reservoir since crosslinking trivalent cations are not present in such water. It is a great advantage that trivalent cations according to the invention are not inhibited by known produced water chemical additives or natural chemical composition of the water. Other existing cations in such water have no crosslinking effect on Xanthan before pH exceeds 9.5 which is never applicable to produced water from reservoir.

The present invention is characterized in that a liquid is added to an unsolved polysaccharide where this can remain unsolved as slurry, partially solved in the liquid or fully solved in the liquid. In the liquid below adequate pH, dissolved crosslinking multivalent cations are added in a pH regimen where crosslinking properties are neutralized. The cations may advantageously be mixed with an acidic coagulant such as PAX/PAC and this or other coagulants may be included in the product. The product is then mixed and brought into contact with contamination in a contaminated water stream.

The product and method of the invention will be further explained in the following description with reference to examples wherein:

Production of Product for Experiments;

Product A 250 ml of monoethylene glycol (MEG) was mixed with 100 ml of water, followed by adding 25 grams of fine Xanthan powder, which was shearmixed and completely solved. The viscous mixture was then added thinned hydrochloric acid until pH 3 was reached. Then 50 g of aluminum chloride was mixed with 650 ml of water under pH 3. This solution was then mixed with the Xanthan/MEG/Water mixture by shearmix. One then got a homogeneously slightly viscous mixture pumpable in dosing pumps, without any kind of crosslinking. The product was then tested 10 ppm in 1 liter of produced water from the oil industry where the pH was 7. After 30 seconds a visual strong flocculation was observed and after 1 minute water was crystal clear with flocculated material on the top.

Product A was tested on 10 different water with different chemical compositions with regard to salinity, hydrogencarbonate content, scale inhibiting chemicals in the water, etc. without any reducing effect being observed.

Product B

Identical mixture for Experiment A was made, but without pH regulation of any of the solutions. The result was full crosslinking in trying to mix polysaccharide with trivalent cation.

Product C

Identical mixture to A was made but only with pH regulation of Xanthan/MEG/Water mixture and loose trivalent cation had pH 7.

Upon mixing, one could see partial crosslinking and the mixture became unstable with excreted liquid. Attempting flocculation in 1 liter of produced water from the oil industry confirmed that the product was completely cross-linked prior to injection. 10 ppm injected product yielded almost no flocculation.

Product D 250 ml of MEG and 100 ml of water were mixed with 25 g of xanthan. The pH was then adjusted to 3.50 g of aluminum chloride was dissolved in 650 ml of polyaluminum chloride with pH 2.5 (PAX). Everything was then blended into a homogeneous viscous mixture. At dosing of 10 mg in 1 liter of produced water extremely fast flocculation and crosslinking were achieved and one had clear water within 30 seconds. This repeated with 10 different water as in experiment A.

Product E

Experiment D was repeated without regulating the pH of the Xanthan/MEG/Water mixture. One achieved by repeatedly attempting flocculation/coagulation and crosslinking in 10 different waters, only coagulation with soft cloudy flocks, which clearly showed that only coagulation from PAX occurred. These flock were very weak compared to when crosslinking was achieved in Run D.

The invention claimed is:

1. A product for injecting into a contaminated water stream for the removal of solved and/or insoluble organic and/or inorganic contaminants from a liquid stream characterized by the product comprises
   a. a base fluid of an alcohol or an alcohol/water mixture, or water
   b. one or more powdered natural anionic polysaccharide/hydrocolloid dispersed, partially solved or solved in the base fluid, said natural polysaccharide/hydrocolloid of the type which has the ability to crosslink with trivalent cations
   c. trivalent cations sufficient to crosslink all polysaccharide/hydrocolloid chains solved in the base fluid; and
   d. wherein the product has a pH value at or below which crosslinking does not occur, and above which crosslinking can occur if the product is pH adjusted above such threshold value, and
   e. wherein the cations are trivalent aluminium or trivalent chromium.

2. The product according to claim 1, wherein the base fluid is monoethylene glycol (MEG).

3. The product according to claim 1 wherein the powdered polysaccharide/hydrocolloid is Xanthan.

4. The product according to any one of claims 1-3, wherein the crosslinking cation consists of at least one of liquid-soluble trivalent aluminum and/or trivalent chromium and wherein the threshold pH is less than 4 if the crosslinking cation is trivalent aluminum, and less than 5 if the crosslinking cation is trivalent chromium.

5. The product according to claim 4, wherein the product further comprises a coagulant with respectively at least equally low pH.

6. The product according to claim 5, characterized in that the coagulant is prepolymerized aluminum.

7. A method for the preparation of a product suitable for injecting into a contaminated water stream for the removal of solved and/or insoluble organic and/or inorganic contaminants from a liquid stream comprising the steps of mixing an anionic polysaccharide and/or hydrocolloid of the type capable of crosslinking with trivalent cations with a liquid or mixture of liquids in which the polysaccharide and/or hydrocolloid remains undissolved, partially solved or solved, adjusting the pH of the mixture to at or below a threshold at or below which intended trivalent cations are not capable of crosslinking with the polysaccharide and/or hydrocolloid and above which the intended trivalent crosslinking cations are capable of crosslinking with the polysaccharide and/or hydrocolloid, after which the intended trivalent crosslinking cations are mixed in the liquid or mixture of liquids such that the anionic polysaccharide and/or hydrocolloid is present together with the trivalent cations in the liquid or liquid mixture in unreacted, stable state, and wherein the cations are trivalent aluminum or trivalent chromium.

8. The method according to claim 7, further comprising the step of adding to the product a coagulant having a pH equal to or lower than the threshold.

9. A method for removing solved and/or insoluble organic and/or inorganic contaminants from a liquid stream comprising the steps of adding a product according to any one of claims 1-6 or made according to claim 7 into a contaminated aqueous liquid with a pH above the threshold pH for crosslinking between polysaccharide/hydrocolloid and multivalent cations of the product, whereby in a first time interval the polysaccharide and/or hydrocolloid bonds to contamination in the liquid, or dissolves and binds to contamination in the liquid, and whereby in a second time interval the pH of the product is raised above the threshold such that cross-linking cations of the product crosslink with the polysaccharide and/or hydrocolloid, whereby the contamination becomes flocculated and agglomerated, and is thereafter separated from the liquid.

10. The method according to claim 9, wherein 1 to 1000 ppm of the product is dosed and mixed into the contaminated liquid.

11. The method according to claim 10 wherein 1-58 ppm of the product is dosed and mixed into the contaminated liquid.

12. The method according to claim 10 wherein 1-20 ppm of the product is dosed and mixed into the contaminated liquid.

* * * * *